US012639902B2

(12) United States Patent
Tsuji et al.

(10) Patent No.: US 12,639,902 B2
(45) Date of Patent: May 26, 2026

(54) MEASUREMENT CONDITION OPTIMIZATION SYSTEM, THREE-DIMENSIONAL DATA MEASUREMENT SYSTEM, MEASUREMENT CONDITION OPTIMIZATION METHOD, AND NON-TRANSITORY COMPUTER-READABLE MEDIUM

(71) Applicant: NEC Corporation, Tokyo (JP)

(72) Inventors: Akira Tsuji, Tokyo (JP); Yoshimasa Ono, Tokyo (JP); Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 18/290,351

(22) PCT Filed: May 20, 2021

(86) PCT No.: PCT/JP2021/019226
§ 371 (c)(1),
(2) Date: Nov. 13, 2023

(87) PCT Pub. No.: WO2022/244206
PCT Pub. Date: Nov. 24, 2022

(65) Prior Publication Data
US 2024/0249486 A1 Jul. 25, 2024

(51) Int. Cl.
*G06T 19/20* (2011.01)
(52) U.S. Cl.
CPC ...... *G06T 19/20* (2013.01); *G06T 2219/2004* (2013.01)
(58) Field of Classification Search
CPC .................... G06T 19/20; G06T 2219/2004
See application file for complete search history.

(56) References Cited

U.S. PATENT DOCUMENTS

2016/0360119 A1* 12/2016 Ilic ........................ H04N 23/635
2016/0364905 A1* 12/2016 Jung ........................ G06T 17/20
(Continued)

FOREIGN PATENT DOCUMENTS

CN 106680798 A 5/2017
CN 111175769 A 5/2020
(Continued)

OTHER PUBLICATIONS

Andersen et al., "AR HMD Guidance for Controlled Hand-Held 3D Acquisition," in IEEE Transactions on Visualization and Computer Graphics, vol. 25, No. 11, pp. 3073-3082, Nov. 2019, doi: 10.1109/TVCG.2019.2932172. (Year: 2019).*
(Continued)

*Primary Examiner* — Daniel F Hajnik
*Assistant Examiner* — Jed-Justin Imperial
(74) *Attorney, Agent, or Firm* — Sughrue Mion, PLLC

(57) ABSTRACT

A measurement condition optimization system according to an aspect of the present disclosure includes: a three-dimensional data input unit that inputs three-dimensional data of a measurement target installation in a predetermined facility measured using a measurement device; an overlapping portion determination unit that performs alignment processing on each piece of the input three-dimensional data, and determines an overlapping portion included in the three-dimensional data after the alignment processing; a measurement policy acquisition unit that acquires a measurement policy at the time of acquiring the three-dimensional data of the measurement target installation in the facility using the measurement device; and a measurement condition adjustment unit that adjusts a measurement condition to satisfy the measurement policy acquired by the measurement policy acquisition unit and make the overlapping portion included
(Continued)

in the three-dimensional data determined by the overlapping portion determination unit within a predetermined range.

8 Claims, 10 Drawing Sheets

(56) References Cited

U.S. PATENT DOCUMENTS

| | | | |
|---|---|---|---|
| 2019/0056483 A1 * | 2/2019 | Bradley | ............... G01S 7/4815 |
| 2020/0356092 A1 | 11/2020 | Gronenborn et al. | |
| 2021/0056716 A1 * | 2/2021 | Mörwald | ............. G01C 15/002 |

FOREIGN PATENT DOCUMENTS

| | | |
|---|---|---|
| JP | 2000-088551 A | 3/2000 |
| JP | 2007-212264 A | 8/2007 |
| JP | 2008-241609 A | 10/2008 |
| JP | 2010-218173 A | 9/2010 |
| JP | 2019-023901 A | 2/2019 |
| JP | 2020-005186 A | 1/2020 |

OTHER PUBLICATIONS

International Search Report for PCT Application No. PCT/JP2021/ 019226, mailed on Jun. 29, 2021.

* cited by examiner

MEASUREMENT CONDITION OPTIMIZATION SYSTEM, THREE-DIMENSIONAL DATA MEASUREMENT SYSTEM, MEASUREMENT CONDITION OPTIMIZATION METHOD, AND NON-TRANSITORY COMPUTER-READABLE MEDIUM

This application is a National Stage Entry of PCT/JP2021/019226 filed on May 20, 2021, the contents of all of which are incorporated herein by reference, in their entirety.

TECHNICAL FIELD

The present invention relates to a measurement condition optimization system, a three-dimensional data measurement system, a measurement condition optimization method, and a non-transitory computer-readable medium.

BACKGROUND ART

In recent years, there has been developed a technology in which three-dimensional data of a measurement target is acquired using a three-dimensional distance sensor such as a light detection and ranging (LIDAR). In addition, there has been developed a technology in which an autonomous movement means goes around, in a state where such a three-dimensional distance sensor is mounted on the autonomous movement means, to acquire three-dimensional data of a social infrastructure facility and automatically inspect installations in the facility using the acquired three-dimensional data.

Patent Literature 1 discloses a technology related to an inspection plan drafting support system capable of appropriately collecting data about a structure to be inspected and appropriately detecting an inspection-required location by a simple means. Patent Literature 2 discloses a technology for easily selecting a suitable image when selecting an image for a predetermined use from a group of images captured by a camera, thereby reducing the user's work effort.

CITATION LIST

Patent Literature

Patent Literature 1: Japanese Unexamined Patent Application Publication No. 2019-023901
Patent Literature 2: Japanese Unexamined Patent Application Publication No. 2020-005186

SUMMARY OF INVENTION

Technical Problem

As described in Background Art, there has been developed a technology in which an autonomous movement means goes around, in a state where a three-dimensional distance sensor such as a LIDAR is mounted on the autonomous movement means, to acquire three-dimensional data of a social infrastructure facility and automatically inspect installations in the facility using the acquired three-dimensional data.

In such a three-dimensional data measurement system, when a measurement condition (a going-around route, a measurement position, a measurement condition, or the like) of the measurement device (the autonomous movement means equipped with the three-dimensional distance sensor)

is not appropriately set, there is a problem that overlapping portions are included in the acquired three-dimensional data in a high ratio. When overlapping portions are included in the acquired three-dimensional data in a high ratio as described above, there are problems that it takes time to acquire the three-dimensional data, and the data amount of the acquired three-dimensional data becomes enormous.

An object of the present disclosure is to provide a measurement condition optimization system, a three-dimensional data measurement system, a measurement condition optimization method, and a non-transitory computer-readable medium capable of optimizing a measurement condition at the time of measuring three-dimensional data of a measurement target installation in a facility using a measurement device.

Solution to Problem

A measurement condition optimization system according to an aspect of the present disclosure includes: a three-dimensional data input unit that inputs three-dimensional data of a measurement target installation in a predetermined facility measured under a predetermined measurement condition using a measurement device; an overlapping portion determination unit that performs alignment processing on each piece of the input three-dimensional data, and determines an overlapping portion included in the three-dimensional data after the alignment processing; a measurement policy acquisition unit that acquires a measurement policy at the time of acquiring the three-dimensional data of the measurement target installation in the facility using the measurement device; and a measurement condition adjustment unit that adjusts the measurement condition to satisfy the measurement policy acquired by the measurement policy acquisition unit and reduce the overlapping portion included in the three-dimensional data determined by the overlapping portion determination unit.

A three-dimensional data measurement system according to an aspect of the present disclosure includes: the above-described measurement condition optimization system; and a measurement device that acquires the three-dimensional data of the measurement target installation in the facility, in which the measurement device newly acquires three-dimensional data of the measurement target installation in the facility using the measurement condition adjusted by the measurement condition adjustment unit.

A measurement condition optimization method according to an aspect of the present disclosure includes: inputting three-dimensional data of a measurement target installation in a predetermined facility measured under a predetermined measurement condition using a measurement device; performing alignment processing on each piece of the input three-dimensional data, and determining an overlapping portion included in the three-dimensional data after the alignment processing; acquiring a measurement policy at the time of acquiring the three-dimensional data of the measurement target installation in the facility using the measurement device; and adjusting the measurement condition to satisfy the acquired measurement policy and reduce the determined overlapping portion included in the three-dimensional data.

A non-transitory computer-readable medium according to an aspect of the present disclosure stores a program for causing a computer to execute measurement condition optimization processing including: inputting three-dimensional data of a measurement target installation in a predetermined facility measured under a predetermined measurement condition using a measurement device; performing alignment processing on each piece of the input three-dimensional data, and determining an overlapping portion included in the three-dimensional data after the alignment processing; acquiring a measurement policy at the time of acquiring the three-dimensional data of the measurement target installation in the facility using the measurement device; and adjusting the measurement condition to satisfy the acquired measurement policy and reduce the determined overlapping portion included in the three-dimensional data.

Advantageous Effects of Invention

According to the present disclosure, it is possible to provide a measurement condition optimization system, a three-dimensional data measurement system, a measurement condition optimization method, and a non-transitory computer-readable medium capable of optimizing a measurement condition at the time of acquiring three-dimensional data of a measurement target installation in a facility using a measurement device.

EXAMPLE EMBODIMENT

First Example Embodiment

Hereinafter, an example embodiment of the present disclosure will be described with reference to the drawings.

Figure 1:
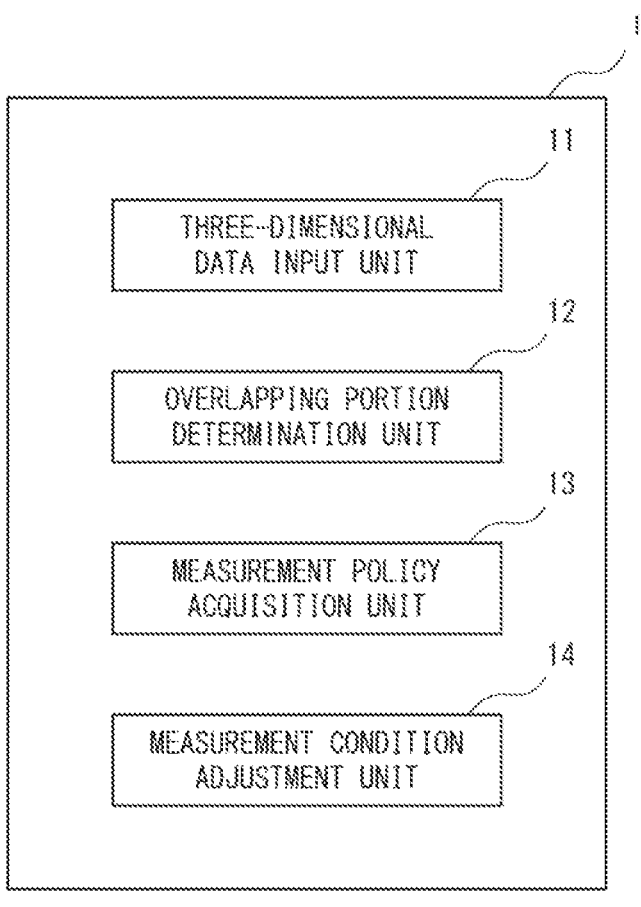
FIG. 1 is a block diagram illustrating an example of a configuration of a measurement condition optimization system according to a first example embodiment.

FIG. 1 is a block diagram illustrating an example of a configuration of a measurement condition optimization system according to a first example embodiment. As illustrated in FIG. 1, the measurement condition optimization system 1 according to the present example embodiment includes a three-dimensional data input unit 11, an overlapping portion determination unit 12, a measurement policy acquisition unit 13, and a measurement condition adjustment unit 14. The measurement condition optimization system 1 according to the present example embodiment is, for example, a system that optimizes a measurement condition of a measurement device when the measurement device goes around to acquire three-dimensional data of a predetermined facility such as a social infrastructure facility.

In the present example embodiment, the measurement device is a device in which a three-dimensional distance sensor such as a LIDAR is mounted on an autonomous movement means. Examples thereof include an autonomously movable vehicle equipped with a LIDAR, an autonomously movable drone equipped with a LIDAR, and an autonomously movable robot equipped with a LIDAR. Note that, in the present example embodiment, the measurement device is not limited thereto, and may be any device as long as a three-dimensional distance sensor is mounted on an autonomous movement means in the device.

Figure 2:
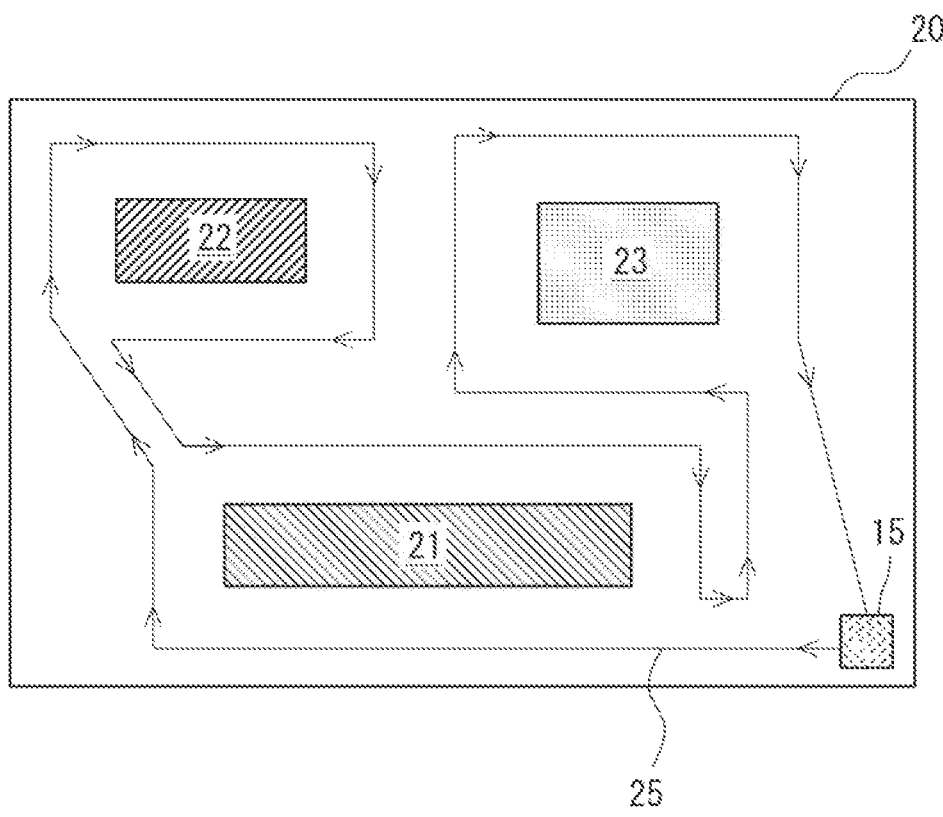
FIG. 2 is a plan view for explaining an example of a going-around route at the time of measuring measurement target installations in a facility using a measurement device.

FIG. 2 is a plan view for explaining an example of a going-around route at the time of measuring measurement target installations in a facility using a measurement device. As illustrated in FIG. 2, measurement target installations 21 to 23 are provided in a predetermined facility 20. For example, the predetermined facility 20 is a social infrastructure facility such as a power plant or a substation. In a case where the predetermined facility 20 is a substation, the measurement target installations 21 to 23 are a transformer, an insulator, a steel structure, a lead wire, and the like. In addition, a measurement device 15 is provided in the facility 20. For example, the measurement device 15 can sequentially acquire three-dimensional data of the measurement target installations 21 to 23 in the facility 20 by moving along a going-around route 25 illustrated in FIG. 2. Note that the scope of application of the present disclosure is not limited to social infrastructure facilities such as power plants and substations, and the present disclosure can be applied to optimize a condition for measuring installations in any other facilities.

The three-dimensional data input unit 11 illustrated in FIG. 1 inputs three-dimensional data of the measurement target installations 21 to 23 in the predetermined facility 20. The three-dimensional data of the measurement target installations 21 to 23 in the predetermined facility 20 can be acquired by measuring the measurement target installations 21 to 23 under a predetermined measurement condition using the measurement device 15. The measurement condition at this time is a measurement condition before optimization, and can be any measurement condition. For example, the measurement condition may be a measurement condition capable of acquiring three-dimensional data for all of the measurement target installations 21 to 23 in the facility 20 can be acquired without omission (that is, a measurement condition under which a larger number of measurement positions are provided).

In the present example embodiment, the three-dimensional data is, for example, point cloud data, three-dimensional CAD data, or the like. For example, the point cloud data is a data group on three axes (XYZ-coordinate axes, distance axes, azimuth angle axes, elevation angle axes, or other axes) orthogonal to each other for expressing facilities and installations on a digital space, which can be acquired using a three-dimensional distance sensor such as a LIDAR. The point cloud data as the three-dimensional data includes at least shape data (typically XYZ coordinates) of the measurement target installations, and may further include additional information such as luminance information.

The three-dimensional data input unit 11 inputs the three-dimensional data measured by the measurement device 15. For example, the three-dimensional data input unit 11 may be a storage device that inputs and stores the three-dimensional data measured by the measurement device 15.

The overlapping portion determination unit 12 illustrated in FIG. 1 performs alignment processing on each piece of the three-dimensional data input to the three-dimensional data input unit 11, and determines an overlapping portion included in the three-dimensional data after the alignment processing. For example, when the point clouds included in three-dimensional data acquired at the measurement positions adjacent to each other among the three-dimensional data after the alignment processing adjoin each other, the overlapping portion determination unit 12 may determine a portion including the adjoining point clouds as an overlapping portion.

Figure 3:
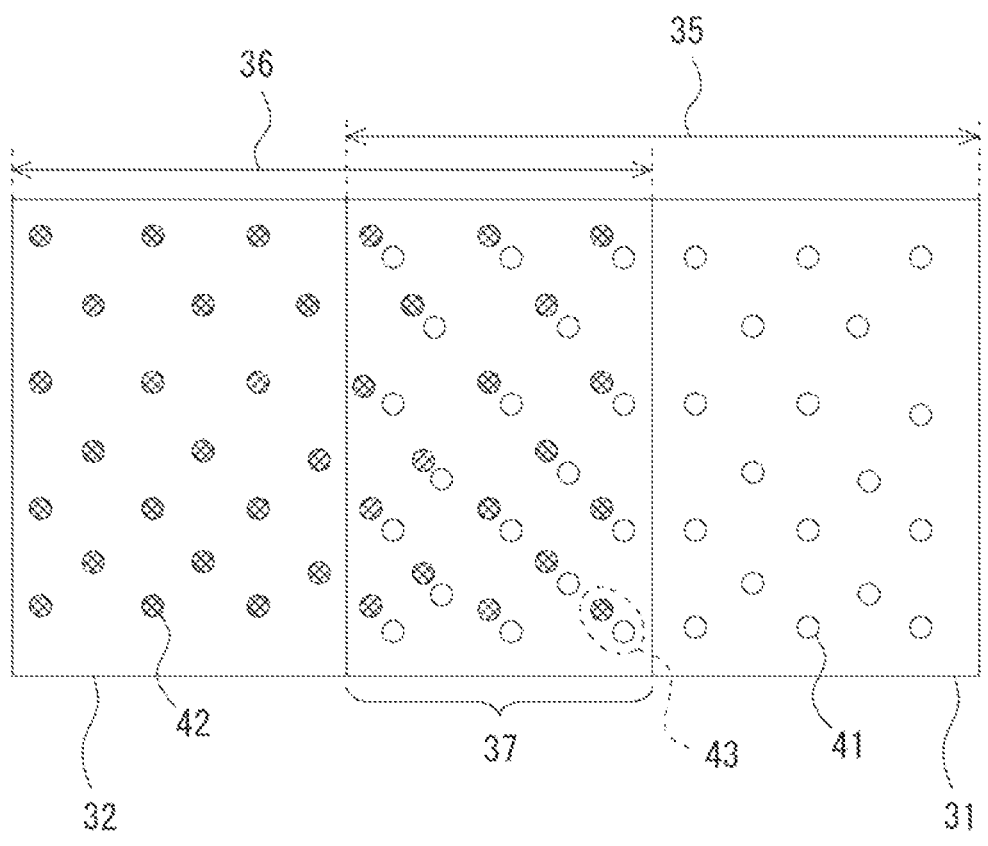
FIG. 3 is a diagram for explaining overlapping portion determination processing of the measurement condition optimization system according to the first example embodiment.

FIG. 3 is a diagram for explaining the overlapping portion determination processing of the measurement condition optimization system according to the present example embodiment. FIG. 3 illustrates an example in which the overlapping portion determination processing is performed on two pieces of three-dimensional data 31 and 32. Note that the two pieces of three-dimensional data 31 and 32 are three-dimensional data measured at different measurement positions (e.g., measurement positions P1 and P2 in FIG. 5).

As illustrated in FIG. 3, the three-dimensional data 31 includes a point cloud 41, and the three-dimensional data 32 includes a point cloud 42. Each of the point clouds 41 and 42 indicates feature points of a measurement target installation. In the example illustrated in FIG. 3, a state after the alignment processing is performed on each piece of the three-dimensional data 31 and 32 is shown. As illustrated in FIG. 3, there is an overlapping portion 37 between a measurement range 35 of the three-dimensional data 31 and a measurement range 36 of the three-dimensional data 32. In the overlapping portion 37, there is a portion 43 where the point cloud 41 of the three-dimensional data 31 and the point cloud 42 of the three-dimensional data 32 adjoin each other. The overlapping portion determination unit 12 detects a portion 43 where the point cloud 41 of the three-dimensional data 31 and the point cloud 42 of the three-dimensional data 32 adjoin each other in this manner, and determines a portion including the portion 43 where the point clouds 41 and 42 adjoin each other as an overlapping portion 37. That is, the portion 43 where the point cloud 41 of the three-dimensional data 31 and the point cloud 42 of the three-dimensional data 32 adjoin each other corresponds to point clouds expressing the same feature points between measurement target installations.

Furthermore, the overlapping portion determination unit 12 may calculate a measurement position or a beam direction at the time of acquiring each of the point clouds 41 and 42 by using information about the point clouds 41 and 42 in the overlapping portion 37. That is, the overlapping portion determination unit 12 may calculate information on measurement positions and beam directions of the measurement device 15 used when the point clouds 41 and 42 are acquired on the basis of the information about the point clouds 41 and 42.

In addition, the overlapping portion determination unit 12 may further calculate a direction of a surface of the measurement target installation on which a beam (a beam emitted from the LIDAR) is incident using the three-dimensional data, and an incident angle of the beam incident on the measurement target installation using the calculated direction of the surface and coordinates of a measurement position to which the beam is emitted.

That is, the overlapping portion determination unit 12 calculates a direction of a surface of the measurement target installation for a measurement position (a position of the LIDAR) using the three-dimensional data (point cloud data). Then, the overlapping portion determination unit 12 can calculate an incident angle of a beam incident on the measurement target installation by using the calculated direction of the surface of the measurement target installation and the coordinates of the measurement position (the position of the LIDAR).

The measurement policy acquisition unit 13 illustrated in FIG. 1 acquires a measurement policy at the time of acquiring three-dimensional data of the measurement target installations 21 to 23 in the facility 20 using the measurement device 15. For example, the measurement policy includes ranges of incident angles of beams incident on the measurement target installations 21 to 23, a resolution that the three-dimensional data measured by the measurement device 15 needs to satisfy, etc. The measurement policy acquisition unit 13 may acquire information regarding a measurement policy input by a user using an input unit 160 (see FIG. 10). Furthermore, the measurement policy acquisition unit 13 may store the information regarding the measurement policy in advance. Note that the measurement policy may be set for each of the measurement target installations 21 to 23, or may be collectively set for the measurement target installations 21 to 23 in the facility 20.

The measurement condition adjustment unit 14 illustrated in FIG. 1 adjusts the measurement condition to satisfy the measurement policy acquired by the measurement policy acquisition unit 13 and reduce the overlapping portion included in the three-dimensional data determined by the overlapping portion determination unit 12. That is, the measurement condition adjustment unit 14 inputs information regarding the overlapping portion included in the three-dimensional data determined by the overlapping portion determination unit 12 and information regarding the measurement policy acquired by the measurement policy acquisition unit 13. Then, the measurement condition adjustment unit 14 adjusts the measurement condition such as a measurement position, a measurement range, and a resolution of the measurement device 15 on the basis of the input information regarding the overlapping portion and the input information regarding the measurement policy. At this time, the measurement condition adjustment unit 14 adjusts the measurement condition of the measurement device 15 to reduce the overlapping portion included in the three-dimensional data.

For example, the measurement policy includes ranges of incident angles of beams incident on the measurement target installations, and the measurement condition of the measurement device 15 includes measurement ranges when the measurement device 15 acquires three-dimensional data of the measurement target installations. In this case, the measurement condition adjustment unit 14 adjusts the measurement ranges of the measurement device 15 so that the ranges of the incident angles of the beams incident on the measurement target installations fall within the range of the measurement policy and the overlapping portion included in the three-dimensional data is reduced.

In addition, for example, the measurement condition may include measurement positions when the measurement device 15 acquires three-dimensional data of the measurement target installations. In this case, the measurement condition adjustment unit 14 may adjust the measurement positions of the measurement device 15 to satisfy the measurement policy and reduce the overlapping portion included in the three-dimensional data.

Furthermore, for example, the measurement policy may include a resolution that the three-dimensional data measured by the measurement device 15 needs to satisfy. In this case, the measurement condition adjustment unit 14 may adjust the measurement condition of the measurement device 15 so that the resolution of the three-dimensional data measured by the measurement device 15 satisfies the measurement policy and the overlapping portion included in the three-dimensional data is reduced.

Here, "the reduction of the overlapping portion included in the three-dimensional data" means that the overlapping portion 37 between the three-dimensional data 31 and the three-dimensional data 32 illustrated in FIG. 3 is reduced. For example, the overlapping portion may be reduced so that the area of the overlapping portion 37 occupying the measurement range 35 of the three-dimensional data 31 is equal to or smaller than a predetermined ratio (for example, equal to or smaller than 5%). Further, the overlapping portion may be reduced so that the data size of the entire three-dimensional data is equal to or smaller than a predetermined data size. In the present example embodiment, it is more preferable as the overlapping portion is smaller, and it is most preferable that there is no overlapping portion. Note that a specific example in a case where the measurement condition of the measurement device 15 is adjusted so that the overlapping portion included in the three-dimensional data is reduced will be described later.

Figure 4:
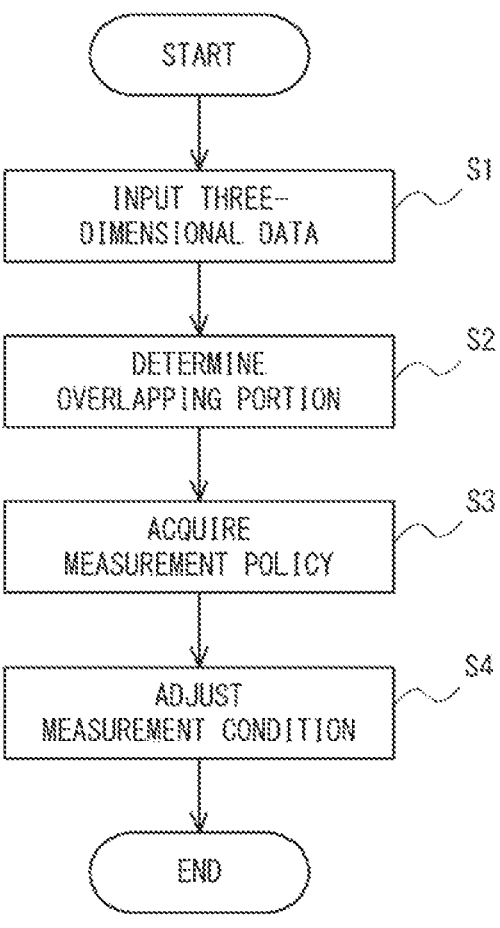
FIG. 4 is a flowchart for explaining an operation of the measurement condition optimization system according to the first example embodiment.

Next, an operation (a measurement condition optimization method) of the measurement condition optimization system according to the present example embodiment will be described. FIG. 4 is a flowchart for explaining the operation of the measurement condition optimization system according to the present example embodiment.

First, the three-dimensional data input unit 11 (see FIG. 1) inputs three-dimensional data of the measurement target installations 21 to 23 in the predetermined facility 20 (step S1). The three-dimensional data of the measurement target installations 21 to 23 in the predetermined facility 20 can be acquired by measuring the measurement target installations 21 to 23 (see FIG. 2) under a predetermined measurement condition using the measurement device 15. The measurement condition at this time is a measurement condition before optimization, and can be any measurement condition.

Figure 5:
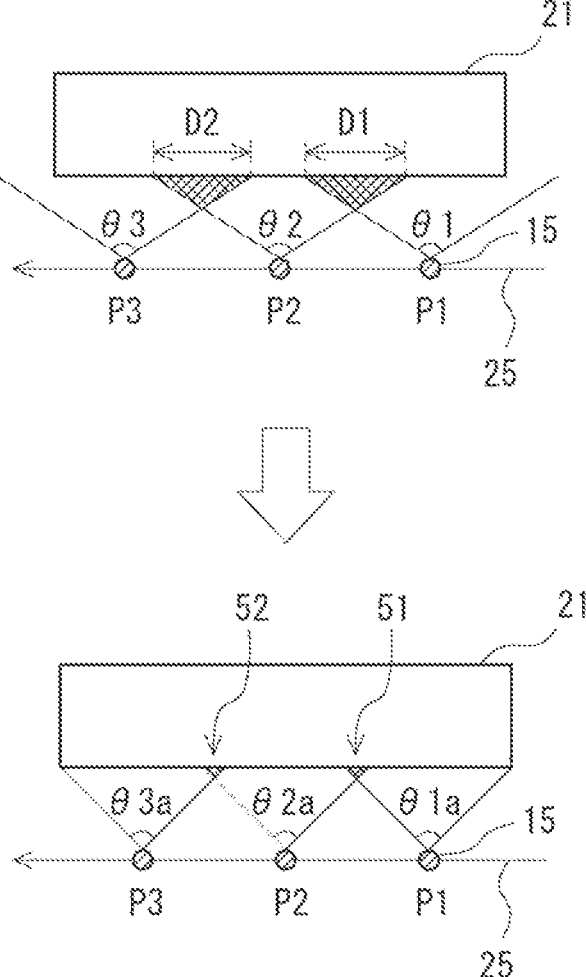
FIG. 5 is a diagram for explaining an example of measurement condition optimization processing.

FIG. 5 is a diagram for explaining an example of measurement condition optimization processing. FIG. 5 illustrates, as an example, a state in which the measurement device 15 acquires three-dimensional data of the measurement target installation 21 at measurement positions P1 to P3 while moving along the going-around route 25. In the present example embodiment, when acquiring the three-dimensional data of the measurement target installation 21, the measurement device 15 stops at the measurement positions P1 to P3 to perform measurements. The same applies to other measurement positions.

As illustrated in the upper diagram of FIG. 5, the measurement device 15 acquires three-dimensional data of the measurement target installation 21 by measuring the measurement target installation 21 at the measurement positions P1 to P3. At this time, the measurement range of the measurement device 15 at the measurement position P1 is θ1, the measurement range of the measurement device 15 at the measurement position P2 is θ2, and the measurement range of the measurement device 15 at the measurement position P3 is θ3. The three-dimensional data input unit 11

(see FIG. 1) inputs the three-dimensional data of the measurement target installation 21 measured in this manner.

Next, the overlapping portion determination unit 12 (see FIG. 1) performs alignment processing on each piece of the three-dimensional data input to the three-dimensional data input unit 11, and determines an overlapping portion included in the three-dimensional data after the alignment processing (step S2). In the example illustrated in FIG. 5, the three-dimensional data of the measurement target installation 21 measured using the measurement device 15 includes overlapping portions D1 and D2. The overlapping portion determination unit 12 determines these overlapping portions D1 and D2.

That is, the overlapping portion D1 is included in the three-dimensional data measured at the measurement position P1 and the three-dimensional data measured at the measurement position P2. In addition, the overlapping portion D2 is included in the three-dimensional data measured at the measurement position P2 and the three-dimensional data measured at the measurement position P3. The overlapping portion determination unit 12 determines such overlapping portions D1 and D2 included in the three-dimensional data input to the three-dimensional data input unit 11.

For example, when the point clouds included in three-dimensional data acquired at the measurement positions adjacent to each other among the three-dimensional data after the alignment processing adjoin each other, the overlapping portion determination unit 12 can determine a portion including the adjoining point clouds as the overlapping portion (see FIG. 3).

Next, the measurement policy acquisition unit 13 (see FIG. 1) acquires a measurement policy at the time of acquiring three-dimensional data of the measurement target installations 21 to 23 in the facility 20 using the measurement device 15 (step S3). For example, the measurement policy includes ranges of incident angles of beams incident on the measurement target installations 21 to 23, a resolution that the three-dimensional data measured by the measurement device 15 needs to satisfy, etc.

Next, the measurement condition adjustment unit 14 (see FIG. 1) adjusts the measurement condition to satisfy the measurement policy acquired by the measurement policy acquisition unit 13 and reduce the overlapping portion included in the three-dimensional data determined by the overlapping portion determination unit 12 (step S4).

For example, the measurement policy includes ranges of incident angles of beams incident on the measurement target installations, and the measurement condition of the measurement device 15 includes measurement ranges when the measurement device 15 acquires three-dimensional data of the measurement target installations. In this case, the measurement condition adjustment unit 14 adjusts the measurement ranges of the measurement device 15 so that the ranges of the incident angles of the beams incident on the measurement target installations fall within the range of the measurement policy and the overlapping portion included in the three-dimensional data is reduced.

Specifically, as illustrated in the lower diagram of FIG. 5, the measurement condition adjustment unit 14 adjusts the measurement ranges of the measurement device 15 so that the measurement range of the measurement device 15 at the measurement position P1 becomes θ1*a* from θ1, the measurement range of the measurement device 15 at the measurement position P2 becomes θ2*a* from θ2, and the measurement range of the measurement device 15 at the measurement position P3 becomes θ3*a* from θ3. The measurement ranges θ1*a* to θ3*a* may be the same angle or different angles. In addition, it is assumed that the measurement ranges θ1a to θ3a satisfy the measurement policy acquired by the measurement policy acquisition unit 13. In this manner, by setting the measurement ranges at the measurement positions P1, P2, and P3 to θ1a, θ2a, and θ3a, respectively, the overlapping portions 51 and 52 included in the three-dimensional data can be reduced. As a result, it is possible to optimize the measurement condition at the time of acquiring three-dimensional data of the measurement target installations in the facility using the measurement device 15.

Figure 6:
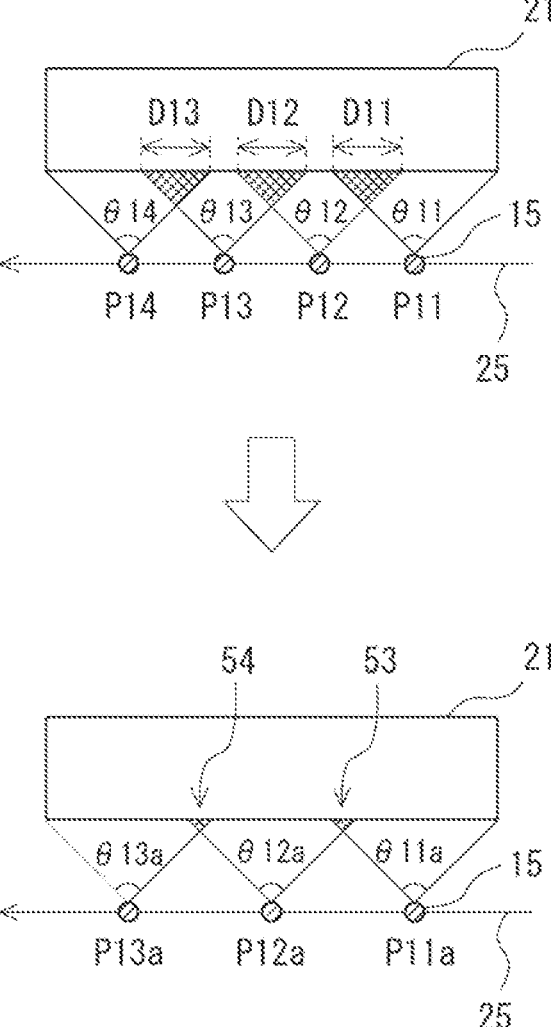
FIG. 6 is a diagram for explaining another example of measurement condition optimization processing.

FIG. 6 is a diagram for explaining another example of measurement condition optimization processing. In an example illustrated in the upper diagram of FIG. 6, a state in which the measurement device 15 acquires three-dimensional data of the measurement target installation 21 at measurement positions P11 to P14 while moving along the going-around route 25 is shown. As illustrated in the upper diagram of FIG. 6, the measurement device 15 acquires three-dimensional data of the measurement target installation 21 by measuring the measurement target installation 21 at the measurement positions P11 to P14. At this time, the measurement range of the measurement device 15 at the measurement position P11 is θ11, the measurement range of the measurement device 15 at the measurement position P12 is θ12, the measurement range of the measurement device 15 at the measurement position P13 is θ13, and the measurement range of the measurement device 15 at the measurement position P14 is θ14. The three-dimensional data input unit 11 (see FIG. 1) inputs the three-dimensional data of the measurement target installation 21 measured in this manner (step S1).

Next, the overlapping portion determination unit 12 (see FIG. 1) performs alignment processing on each piece of the three-dimensional data input to the three-dimensional data input unit 11, and determines overlapping portions D11, D12, and D13 included in the three-dimensional data after the alignment processing (step S2). Specifically, as illustrated in the upper diagram of FIG. 6, the overlapping portion D11 is included in the three-dimensional data measured at the measurement position P11 and the three-dimensional data measured at the measurement position P12. In addition, the overlapping portion D12 is included in the three-dimensional data measured at the measurement position P12 and the three-dimensional data measured at the measurement position P13. In addition, the overlapping portion D13 is included in the three-dimensional data measured at the measurement position P13 and the three-dimensional data measured at the measurement position P14. The overlapping portion determination unit 12 determines such overlapping portions D11, D12, and D13 included in the three-dimensional data input to the three-dimensional data input unit 11.

Next, the measurement policy acquisition unit 13 (see FIG. 1) acquires a measurement policy at the time of acquiring three-dimensional data of the measurement target installations 21 to 23 in the facility 20 using the measurement device 15 (step S3).

Next, the measurement condition adjustment unit 14 (see FIG. 1) adjusts the measurement condition to satisfy the measurement policy acquired by the measurement policy acquisition unit 13 and reduce the overlapping portion included in the three-dimensional data determined by the overlapping portion determination unit 12 (step S4).

In the example illustrated in FIG. 6, the measurement condition adjustment unit 14 adjusts the measurement positions P11 to P14 (the upper diagram of FIG. 6) of the measurement device 15 to measurement positions P11a to P13a (the lower diagram of FIG. 6). In addition, the measurement condition adjustment unit 14 adjusts the measurement ranges of the measurement device 15 so that the measurement range of the measurement device 15 at the measurement position P11a is θ11a, the measurement range of the measurement device 15 at the measurement position P12a is θ12a, and the measurement range of the measurement device 15 at the measurement position P13a is θ13a. The measurement ranges θ11a to θ13a may be the same angle or different angles. In addition, it is assumed that the measurement ranges θ11a to θ13a satisfy the measurement policy acquired by the measurement policy acquisition unit 13. In this manner, by adjusting the measurement positions and the measurement ranges of the measurement device 15, the measurement condition adjustment unit 14 can reduce the overlapping portions 53 and 54 included in the three-dimensional data. As a result, it is possible to optimize the measurement condition at the time of acquiring three-dimensional data of the measurement target installations in the facility using the measurement device 15.

Figure 7:
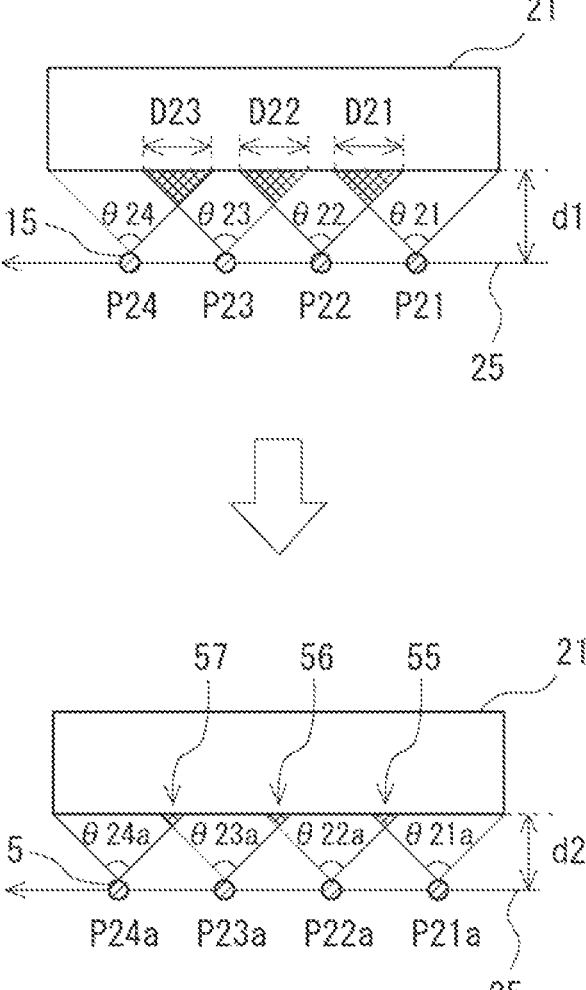
FIG. 7 is a diagram for explaining another example of measurement condition optimization processing.

FIG. 7 is a diagram for explaining another example of measurement condition optimization processing. In an example illustrated in the upper diagram of FIG. 7, a state in which the measurement device 15 acquires three-dimensional data of the measurement target installation 21 at measurement positions P21 to P24 while moving along the going-around route 25 is shown. As illustrated in the upper diagram of FIG. 7, the measurement device 15 acquires three-dimensional data of the measurement target installation 21 by measuring the measurement target installation 21 at the measurement positions P21 to P24. At this time, the measurement range of the measurement device 15 at the measurement position P21 is θ21, the measurement range of the measurement device 15 at the measurement position P22 is θ22, the measurement range of the measurement device 15 at the measurement position P23 is θ23, and the measurement range of the measurement device 15 at the measurement position P24 is θ24. The three-dimensional data input unit 11 (see FIG. 1) inputs the three-dimensional data of the measurement target installation 21 measured in this manner (step S1).

Next, the overlapping portion determination unit 12 (see FIG. 1) performs alignment processing on each piece of the three-dimensional data input to the three-dimensional data input unit 11, and determines overlapping portions D21, D22, and D23 included in the three-dimensional data after the alignment processing (step S2). Specifically, as illustrated in the upper diagram of FIG. 7, the overlapping portion D21 is included in the three-dimensional data measured at the measurement position P21 and the three-dimensional data measured at the measurement position P22. In addition, the overlapping portion D22 is included in the three-dimensional data measured at the measurement position P22 and the three-dimensional data measured at the measurement position P23. In addition, the overlapping portion D23 is included in the three-dimensional data measured at the measurement position P23 and the three-dimensional data measured at the measurement position P24. The overlapping portion determination unit 12 determines such overlapping portions D21, D22, and D23 included in the three-dimensional data input to the three-dimensional data input unit 11.

Next, the measurement policy acquisition unit 13 (see FIG. 1) acquires a measurement policy at the time of acquiring three-dimensional data of the measurement target installations 21 to 23 in the facility 20 using the measurement device 15 (step S3).

Next, the measurement condition adjustment unit 14 (see FIG. 1) adjusts the measurement condition to satisfy the measurement policy acquired by the measurement policy acquisition unit 13 and reduce the overlapping portion included in the three-dimensional data determined by the overlapping portion determination unit 12 (step S4).

In the example illustrated in FIG. 7, the measurement condition adjustment unit 14 adjusts the measurement positions P21 to P24 (the upper diagram of FIG. 7) of the measurement device 15 to measurement positions P21$a$ to P24$a$ (the lower diagram of FIG. 7). That is, in the example illustrated in FIG. 7, as illustrated in the upper diagram of FIG. 7, the measurement positions P21 to P24 of the measurement device 15 are spaced apart from the measurement target installation 21 by a distance d1, and the distance between the measurement device 15 and the measurement target installation 21 is too large. Therefore, the resolution requirement as the measurement policy is not satisfied.

In this case, the measurement condition adjustment unit 14 adjusts the measurement positions of the measurement device 15 to approach the measurement target installation 21 so as to satisfy the resolution requirement of the measurement policy. That is, as illustrated in the lower diagram of FIG. 7, the measurement condition adjustment unit 14 adjusts the measurement positions of the measurement device 15 to measurement positions P21$a$ to P24$a$ so that the distance between the measurement device 15 and the measurement target installation 21 becomes a distance d2 (d2<d1). In addition, the measurement condition adjustment unit 14 adjusts the measurement ranges of the measurement device 15 so that the measurement range of the measurement device 15 at the measurement position P21$a$ is θ21$a$, the measurement range of the measurement device 15 at the measurement position P22$a$ is θ22$a$, the measurement range of the measurement device 15 at the measurement position P23$a$ is θ23$a$, and the measurement range of the measurement device 15 at the measurement position P24$a$ is θ24$a$.

The measurement ranges θ21$a$ to θ24$a$ may be the same angle or different angles. In addition, it is assumed that the measurement ranges θ21$a$ to θ24$a$ satisfy the measurement policy acquired by the measurement policy acquisition unit 13. In this manner, by adjusting the measurement positions and the measurement ranges of the measurement device 15, the measurement condition adjustment unit 14 can reduce the overlapping portions 55, 56, and 57 included in the three-dimensional data. As a result, it is possible to optimize the measurement condition at the time of acquiring three-dimensional data of the measurement target installations in the facility using the measurement device 15.

As described above, in the present example embodiment, the measurement condition of the measurement device is optimized to reduce the overlapping portion included in the acquired three-dimensional data. By optimizing the measurement condition of the measurement device as described above, it is possible to shorten a measurement time when the measurement device acquires the three-dimensional data, and it is also possible to reduce a data amount of the acquired three-dimensional data. Furthermore, since the measurement time of the measurement device can be shortened, the power consumption of the measurement device can be suppressed.

Second Example Embodiment

Figure 8:
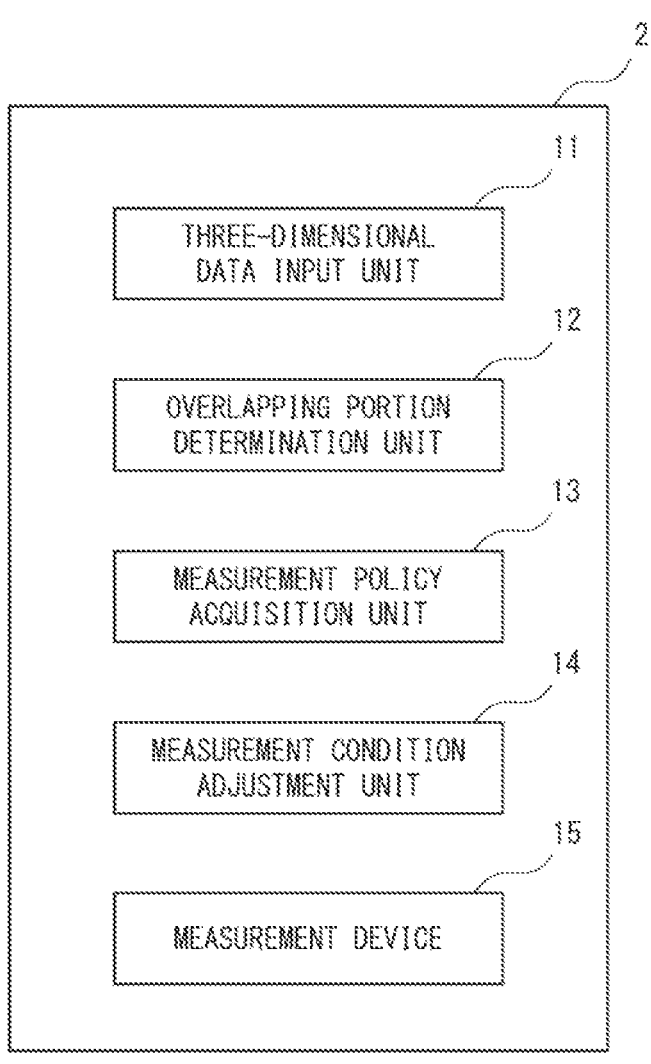
FIG. 8 is a block diagram illustrating an example of a configuration of a three-dimensional data measurement system according to a second example embodiment.

Next, a second example embodiment of the present disclosure will be described. FIG. 8 is a block diagram illustrating an example of a configuration of a three-dimensional data measurement system according to a second example embodiment. As illustrated in FIG. 8, the three-dimensional data measurement system 2 according to the present example embodiment includes a three-dimensional data input unit 11, an overlapping portion determination unit 12, a measurement policy acquisition unit 13, a measurement condition adjustment unit 14, and a measurement device 15. The three-dimensional data measurement system 2 according to the present example embodiment is different from the measurement condition optimization system 1 described in the first example embodiment in that the measurement device 15 is provided. The other configurations and operations are similar to those described in the first example embodiment, and thus, redundant description will be omitted.

In the three-dimensional data measurement system 2 according to the present example embodiment, the measurement device 15 is configured to acquire three-dimensional data of the measurement target installations 21 to 23 (see FIG. 2) in the facility 20. The measurement device 15 newly acquires three-dimensional data of the measurement target installations 21 to 23 in the facility 20 using the measurement condition adjusted by the measurement condition adjustment unit 14. For example, after adjusting the measurement condition, the measurement condition adjustment unit 14 supplies the adjusted measurement condition to the measurement device 15. When acquiring three-dimensional data of the measurement target installations 21 to 23 while moving along the going-around route 25 in the facility 20, the measurement device 15 acquires the three-dimensional data of the measurement target installations 21 to 23 using the adjusted measurement condition supplied from the measurement condition adjustment unit 14.

In this manner, the measurement device 15 newly acquires three-dimensional data of the measurement target installations 21 to 23 using the adjusted measurement condition, that is, the measurement condition optimized to reduce the overlapping portion included in the three-dimensional data. As a result, it is possible to shorten a measurement time of the measurement device 15, and it is also possible to reduce a data amount of the acquired three-dimensional data. Furthermore, since the measurement time of the measurement device 15 can be shortened, the power consumption of the measurement device 15 can be suppressed.

In addition, the measurement device 15 may acquire three-dimensional data input to the three-dimensional data input unit 11 illustrated in FIG. 1. That is, the measurement device 15 may acquire three-dimensional data of the measurement target installations 21 to 23 in the facility 20 under the measurement condition before optimization, and supply the acquired three-dimensional data to the three-dimensional data input unit 11. For example, the measurement device 15 first acquires three-dimensional data under a measurement condition capable of acquiring three-dimensional data for all of the measurement target installations 21 to 23 in the facility 20 can be acquired without omission (that is, a measurement condition under which a larger number of measurement positions are provided). Thereafter, the measurement device 15 may newly acquire three-dimensional data of the measurement target installations 21 to 23 using an optimized measurement condition.

In the three-dimensional data measurement system 2 according to the present example embodiment, the three-dimensional data input unit 11, the overlapping portion determination unit 12, the measurement policy acquisition unit 13, the measurement condition adjustment unit 14, and the measurement device 15 may be integrally configured as the same device. In this case, the three-dimensional data measurement system 2 including the measurement device 15 acquires the three-dimensional data of the measurement target installations 21 to 23.

In the three-dimensional data measurement system 2 according to the present example embodiment, the measurement device 15 may be provided separately from the other components, i.e., the three-dimensional data input unit 11, the overlapping portion determination unit 12, the measurement policy acquisition unit 13, and the measurement condition adjustment unit 14. That is, the three-dimensional data measurement system 2 according to the present example embodiment may be configured using the measurement condition optimization system 1 (see FIG. 1) according to the first example embodiment and the measurement device 15 provided separately from the measurement condition optimization system 1. In this case, the measurement device 15 acquires three-dimensional data of the measurement target installations 21 to 23.

Third Example Embodiment

Figure 9:
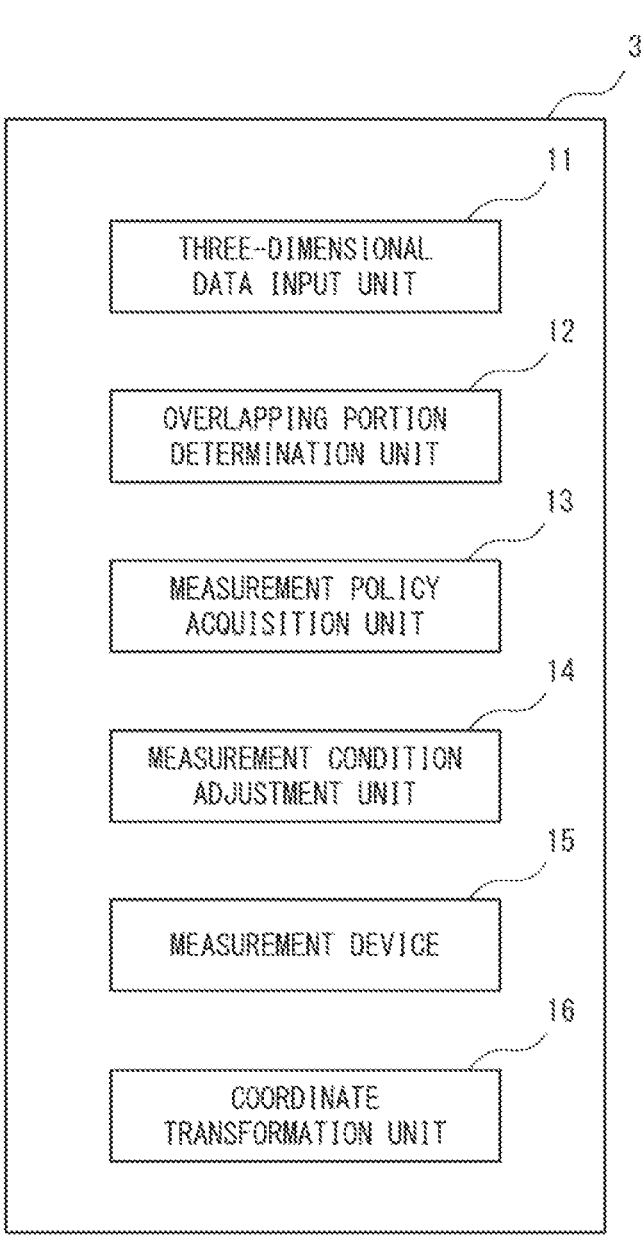
FIG. 9 is a block diagram illustrating an example of a configuration of a three-dimensional data measurement system according to a third example embodiment.

Next, a third example embodiment of the present disclosure will be described. FIG. 9 is a block diagram illustrating an example of a configuration of a three-dimensional data measurement system according to a third example embodiment. As illustrated in FIG. 9, the three-dimensional data measurement system 3 according to the present example embodiment includes a three-dimensional data input unit 11, an overlapping portion determination unit 12, a measurement policy acquisition unit 13, a measurement condition adjustment unit 14, a measurement device 15, and a coordinate transformation unit 16. The three-dimensional data measurement system 3 according to the present example embodiment is different from the three-dimensional data measurement system 2 described in the second example embodiment in that the coordinate transformation unit 16 is provided. The other configurations and operations are similar to those described in the first and second example embodiments, and thus, redundant description will be omitted.

In the three-dimensional data measurement system 3 according to the present example embodiment, the coordinate transformation unit 16 is configured to transform coordinates of three-dimensional data newly acquired by the measurement device 15. Specifically, the coordinate transformation unit 16 transforms the coordinates of the three-dimensional data newly acquired by the measurement device 15 using a coordinate transformation parameter. The coordinate transformation parameter used at this time is a coordinate transformation parameter used when the overlapping portion determination unit 12 performs alignment processing on each piece of three-dimensional data input to the three-dimensional data input unit 11.

Specifically, when performing the alignment processing on each piece of three-dimensional data input to the three-dimensional data input unit 11, the overlapping portion determination unit 12 determines a coordinate transformation parameter in order to combine the three-dimensional data. The overlapping portion determination unit 12 outputs information regarding the coordinate transformation parameter determined at this time to the coordinate transformation unit 16. For example, the coordinate transformation parameter is a transformation parameter (translation, rotation) for the point cloud data at each measurement position.

The coordinate transformation unit 16 transforms the coordinates of the three-dimensional data newly acquired by the measurement device 15 using the coordinate transformation parameter supplied from the overlapping portion determination unit 12. In this case, the measurement positions of the three-dimensional data input to the three-dimensional data input unit 11 and the measurement positions of the three-dimensional data newly acquired by the measurement device 15 are the same. That is, since the measurement positions of the three-dimensional data input to the three-dimensional data input unit 11 and the measurement positions of the three-dimensional data newly acquired by the measurement device 15 are the same, the coordinate transformation unit 16 can use the same coordinate transformation parameter as the coordinate transformation parameter used in the overlapping portion determination unit 12.

In a case where the measurement positions of the three-dimensional data input to the three-dimensional data input unit 11 are different from the measurement positions of the three-dimensional data newly acquired by the measurement device 15 (that is, in a case where the measurement condition for the measurement positions has been changed), processing is performed as follows. That is, the overlapping portion determination unit 12 supplies three-dimensional data subjected to alignment processing (that is, combined three-dimensional data) to the coordinate transformation unit 16. Then, the coordinate transformation unit 16 performs alignment of three-dimensional data newly acquired by the measurement device 15 with the combined three-dimensional data supplied from the overlapping portion determination unit 12, performs coordinate transformation of the three-dimensional data newly acquired by the measurement device 15, and determines a coordinate transformation parameter. Thereafter, when three-dimensional data is newly acquired using the measurement device 15, the three-dimensional data is acquired at the same measurement position. Therefore, when transforming the coordinates of the three-dimensional data newly acquired by the measurement device 15, the coordinate transformation unit 16 can use the coordinate transformation parameter determined as described above.

In the present example embodiment, as described above, since the already-obtained coordinate transformation parameter is used when the coordinates of the three-dimensional data newly acquired by the measurement device 15 are transformed, the load of the coordinate transformation processing can be reduced.

Note that the above-described example embodiments can be implemented by causing a central processing unit (CPU) to execute a computer program for processing of each component.

That is, the above-described example embodiments may be realized by causing a computer to execute a program for measurement condition optimization processing including: inputting three-dimensional data of a measurement target installation in a predetermined facility measured under a predetermined measurement condition using a measurement device; performing alignment processing on each piece of the input three-dimensional data and determining an overlapping portion included in the three-dimensional data after the alignment processing; acquiring a measurement policy at the time of acquiring the three-dimensional data of the measurement target installation in the facility using the measurement device; and adjusting the measurement condition to satisfy the acquired measurement policy and reduce the determined overlapping portion included in the three-dimensional data.

Figure 10:
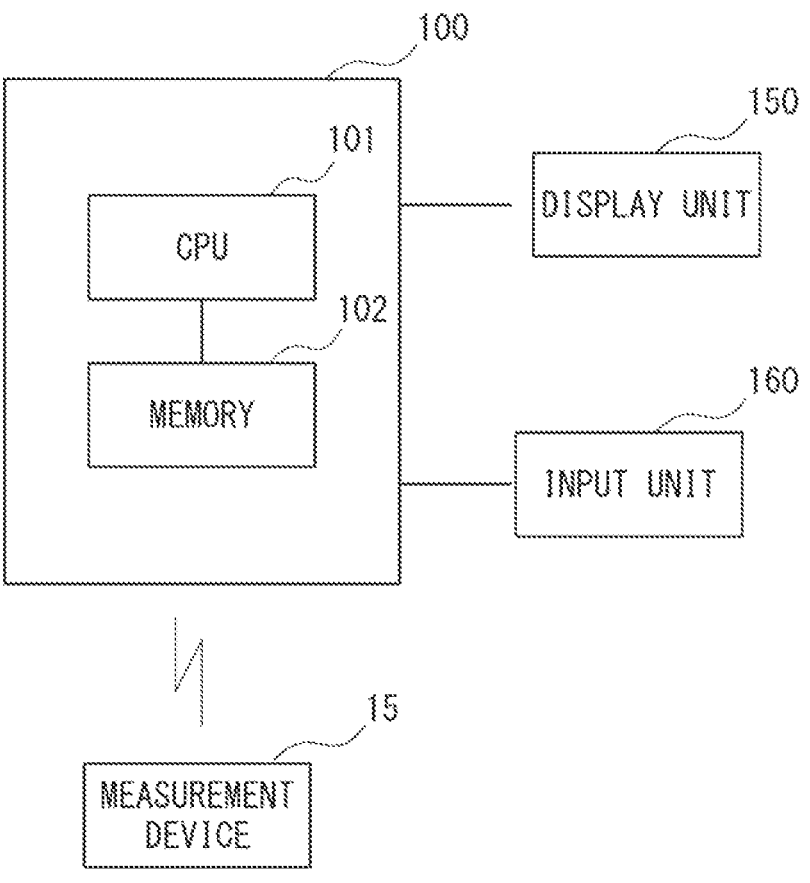
FIG. 10 is a block diagram illustrating an example of a configuration of hardware including a measurement condition optimization system and a three-dimensional data measurement system according to the present disclosure.

FIG. 10 is a block diagram for explaining an example of a configuration of hardware including the measurement condition optimization system according to the present example embodiment. As illustrated in FIG. 10, the measurement condition optimization system according to the present example embodiment can be configured using an arithmetic processing device 100 including a CPU (101) and a memory 102. In the present example embodiment, the measurement condition optimization system 1 can be configured by causing the CPU (101) to execute a program for the above-described measurement condition optimization processing. A display unit 150 and an input unit 160 are connected to the arithmetic processing device 100.

The display unit 150 is configured using a liquid crystal display, an organic electro-luminescence (EL) display, or the like. The display unit 150 may display a measurement condition of the measurement device 15, three-dimensional data after alignment processing, three-dimensional data of the measurement target installations 21 to 23 measured by the measurement device 15, and the like.

Furthermore, for example, the user may input a measurement policy and a measurement condition by operating the input unit 160 (a keyboard, a mouse, or the like).

In addition, the arithmetic processing device 100 (the measurement condition optimization system 1) may be configured to be able to transmit an adjusted measurement condition (an optimized measurement condition) to the measurement device 15. When an adjusted measurement condition is supplied from the arithmetic processing device 100, the measurement device 15 performs measurement based on the supplied adjusted measurement condition.

The measurement condition optimization system 1 (the arithmetic processing device 100) may be provided in each facility 20. In addition, the measurement condition optimization system 1 (the arithmetic processing device 100) may be configured as an application server. In a case where the measurement condition optimization system 1 is configured as an application server, a plurality of users (facilities) can access the measurement condition optimization system 1 to optimize measurement conditions of the measurement devices 15 of the respective facilities.

Furthermore, in the above-described example embodiment, the program can be stored using various types of non-transitory computer-readable media and supplied to the computer. The non-transitory computer-readable media include various types of tangible storage media. Examples of the non-transitory computer-readable media include a magnetic recording medium (specifically, a flexible disk, a magnetic tape, or a hard disk drive), a magneto-optical recording medium (specifically, a magneto-optical disk), a CD-read only memory (ROM), a CD-R, a CD-R/W, and a semiconductor memory (specifically, a mask ROM, a programmable ROM (PROM), an erasable PROM (EPROM), a flash ROM, or a random access memory (RAM). In addition, the program may be supplied to the computer by various types of transitory computer-readable media. Examples of transitory computer-readable media include electrical signals, optical signals, and electromagnetic waves. The transitory computer-readable media can supply the program to the computer via a wired communication path, such as an electric wire and an optical fiber, or via a wireless communication path.

Note that the present disclosure is not limited to the above-described example embodiments, and can be appropriately modified without departing from the gist. Furthermore, the present disclosure may be implemented by appropriately combining the example embodiments.

REFERENCE SIGNS LIST

1 MEASUREMENT CONDITION OPTIMIZATION SYSTEM
2, 3 THREE-DIMENSIONAL DATA MEASUREMENT SYSTEM
11 THREE-DIMENSIONAL DATA INPUT UNIT
12 OVERLAPPING PORTION DETERMINATION UNIT
13 MEASUREMENT POLICY ACQUISITION UNIT
14 MEASUREMENT CONDITION ADJUSTMENT UNIT
15 MEASUREMENT DEVICE
16 COORDINATE TRANSFORMATION UNIT
20 FACILITY
21, 22, 23 MEASUREMENT TARGET INSTALLATION
25 GOING-AROUND ROUTE
31, 32 THREE-DIMENSIONAL DATA
20 35, 36 MEASUREMENT RANGE
37 OVERLAPPING PORTION
41, 42 POINT CLOUD
100 ARITHMETIC PROCESSING DEVICE
101 CPU
102 MEMORY
150 DISPLAY UNIT
160 INPUT UNIT

What is claimed is:

1. A measurement condition optimization system comprising:
   a memory storing instructions; and
   a processor configured to execute the instructions to:
   input three-dimensional data of a measurement target installation in a predetermined facility measured under a predetermined measurement condition using a measurement device;
   perform alignment processing on each piece of the input three-dimensional data, and determine an overlapping portion included in the three-dimensional data after the alignment processing;
   acquire a measurement policy at the time of acquiring the three-dimensional data of the measurement target installation in the facility using the measurement device; and
   adjust the measurement condition to satisfy the measurement policy acquired by the processor and make the overlapping portion included in the three-dimensional data determined by the processor within a predetermined range; wherein
   the measurement policy includes a range of an incident angle of a beam incident on the measurement target installation,
   the measurement condition includes a measurement range when the measurement device acquires the three-dimensional data of the measurement target installation, and
   the processor further executes the instructions to:
   adjust the measurement range of the measurement device so that the range of the incident angle of the beam incident on the measurement target installation falls within the range of the measurement policy and the overlapping portion included in the three-dimensional data falls within a predetermined range, and calculate a direction of a surface of the measurement target installation on which the beam is incident using the three-dimensional data, and an incident angle of the beam incident on the measurement target installation using the calculated direction of the surface and coordinates of a measurement position to which the beam is emitted.

2. The measurement condition optimization system according to claim 1, wherein the measurement condition includes a measurement position when the measurement device acquires the three-dimensional data of the measurement target installation, and the processor adjusts the measurement position of the measurement device to satisfy the measurement policy and make the overlapping portion included in the three-dimensional data within a predetermined range.

3. The measurement condition optimization system according claim 1, wherein the measurement policy includes a resolution that the three-dimensional data measured by the measurement device needs to satisfy, and the processor further executes the instructions to adjust the measurement condition of the measurement device so that the resolution of the three-dimensional data measured by the measurement device satisfies the measurement policy and the overlapping portion included in the three-dimensional data falls within a predetermined range.

4. The measurement condition optimization system according to claim 1, wherein when point clouds included in three-dimensional data acquired at measurement positions adjacent to each other among the three-dimensional data after the alignment processing adjoin each other, the a portion including the adjoining point clouds as the overlapping portion is determined.

5. A three-dimensional data measurement system comprising:

the measurement condition optimization system according to claim 1; and a measurement device configured to acquire the three-dimensional data of the measurement target installation in the facility, wherein the measurement device newly acquires three-dimensional data of the measurement target installation in the facility using the adjusted measurement condition.

6. The three-dimensional data measurement system according to claim 5, wherein the processor further executes the instructions: to transform coordinates of the three-dimensional data newly acquired by the measurement device, wherein the coordinates of the three-dimensional data newly acquired by the measurement device are transformed by using a coordinate transformation parameter used when the alignment processing is performed on each piece of the input three-dimensional data.

7. A measurement condition optimization method comprising:

inputting three-dimensional data of a measurement target installation in a predetermined facility measured under a predetermined measurement condition using a measurement device;

performing alignment processing on each piece of the input three-dimensional data, and determining an overlapping portion included in the three-dimensional data after the alignment processing;

acquiring a measurement policy at the time of acquiring the three-dimensional data of the measurement target installation in the facility using the measurement device; and adjusting the measurement condition to satisfy the acquired measurement policy and make the determined overlapping portion included in the three-dimensional data within a predetermined range; wherein the measurement policy includes a range of an incident angle of a beam incident on the measurement target installation, the measurement condition includes a measurement range when the measurement device acquires the three-dimensional data of the measurement target installation, and adjusting the measurement range of the measurement device so that the range of the incident angle of the beam incident on the measurement target installation falls within the range of the measurement policy and the overlapping portion included in the three-dimensional data falls within a predetermined range, and wherein further calculating a direction of a surface of the measurement target installation on which the beam is incident using the three-dimensional data, and an incident angle of the beam incident on the measurement target installation using the calculated direction of the surface and coordinates of a measurement position to which the beam is emitted.

8. A non-transitory computer-readable medium configured to store a program for causing a computer to execute measurement condition optimization processing including:

inputting three-dimensional data of a measurement target installation in a predetermined facility measured under a predetermined measurement condition using a measurement device;

performing alignment processing on each piece of the input three-dimensional data, and determining an overlapping portion included in the three-dimensional data after the alignment processing;

acquiring a measurement policy at the time of acquiring the three-dimensional data of the measurement target installation in the facility using the measurement device; and adjusting the measurement condition to satisfy the acquired measurement policy and make the determined overlapping portion included in the three-dimensional data within a predetermined range; wherein the measurement policy includes a range of an incident angle of a beam incident on the measurement target installation, the measurement condition includes a measurement range when the measurement device acquires the three-dimensional data of the measurement target installation, and adjusting the measurement range of the measurement device so that the range of the incident angle of the beam incident on the measurement target installation falls within the range of the measurement policy and the overlapping portion included in the three-dimensional data falls within a predetermined range, and wherein further calculating a direction of a surface of the measurement target installation on which the beam is incident using the three-dimensional data, and an incident angle of the beam incident on the measurement target installation using the calculated direction of the surface and coordinates of a measurement position to which the beam is emitted.

\* \* \* \* \*